United States Patent
Lee et al.

(10) Patent No.: US 7,020,743 B2
(45) Date of Patent: Mar. 28, 2006

(54) ATOMIC REMOTE MEMORY OPERATIONS IN CACHE MIRRORING STORAGE SYSTEMS

(75) Inventors: Whay Sing Lee, Newark, CA (US); Raghavendra J. Rao, Fremont, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 403 days.

(21) Appl. No.: 10/373,922

(22) Filed: Feb. 24, 2003

(65) Prior Publication Data

US 2004/0168032 A1    Aug. 26, 2004

(51) Int. Cl.
*G06F 12/00* (2006.01)

(52) U.S. Cl. .............. 711/113; 711/114; 711/162; 714/6

(58) Field of Classification Search .......... 711/3, 711/113, 114, 141, 118, 162; 714/6
See application file for complete search history.

(56) References Cited

U.S. PATENT DOCUMENTS

| | | | | |
|---|---|---|---|---|
| 5,742,792 A * | 4/1998 | Yanai et al. | ............... | 711/162 |
| 5,889,935 A * | 3/1999 | Ofek et al. | ............... | 714/6 |
| 5,901,327 A * | 5/1999 | Ofek | ............... | 710/5 |
| 5,933,653 A * | 8/1999 | Ofek | ............... | 710/6 |
| 6,044,444 A * | 3/2000 | Ofek | ............... | 711/162 |
| 6,052,797 A * | 4/2000 | Ofek et al. | ............... | 714/6 |
| 6,157,991 A * | 12/2000 | Arnon | ............... | 711/161 |
| 6,173,377 B1 * | 1/2001 | Yanai et al. | ............... | 711/162 |
| 6,477,627 B1 * | 11/2002 | Ofek | ............... | 711/162 |
| 6,502,205 B1 * | 12/2002 | Yanai et al. | ............... | 714/7 |
| 6,587,935 B1 * | 7/2003 | Ofek | ............... | 711/162 |
| 6,795,850 B1 * | 9/2004 | Wu et al. | ............... | 709/213 |
| 6,898,687 B1 * | 5/2005 | Wu et al. | ............... | 711/173 |
| 2002/0199058 A1 * | 12/2002 | Ofek | ............... | 711/112 |
| 2003/0028726 A1 * | 2/2003 | Gaertner et al. | ............... | 711/114 |
| 2004/0064639 A1 * | 4/2004 | Sicola et al. | ............... | 711/114 |
| 2004/0073831 A1 * | 4/2004 | Yanai et al. | ............... | 714/7 |
| 2004/0117562 A1 * | 6/2004 | Wu et al. | ............... | 711/147 |
| 2004/0117563 A1 * | 6/2004 | Wu et al. | ............... | 711/150 |
| 2004/0117579 A1 * | 6/2004 | Wu et al. | ............... | 711/170 |
| 2004/0117580 A1 * | 6/2004 | Wu et al. | ............... | 711/170 |

* cited by examiner

*Primary Examiner*—Kevin Verbrugge
(74) *Attorney, Agent, or Firm*—Blakely, Sokoloff, Taylor & Zafman LLP (57) ABSTRACT

Embodiments of the present invention provide methods and apparatuses for accessing MD atomically. For one embodiment, the local cache and the remote cache are each provided with an MBE. To perform an atomic access operation, the local processing system allocates a burst descriptor buffer. The burst descriptor buffer is used to specify the addresses to be atomically accessed. For write operations, the burst descriptor buffer also specifies the update data. The addresses, and data, if any, are then transmitted to the remote cache as a series of packets constituting a single data access request. The MBE of the remote cache then performs the operations contained in the request. Upon completion of all of the operations the remote MBE transmits an acknowledgement. For read operations the remote MBE also transmits the requested data.

34 Claims, 6 Drawing Sheets

ATOMIC REMOTE MEMORY OPERATIONS IN CACHE MIRRORING STORAGE SYSTEMS

FIELD

Embodiments of the invention relate generally to the field of data storage and more particularly to methods for providing accurate cache mirroring.

BACKGROUND

The continued increase in data storage has been accompanied by an increasing need to create more than one accurate copy of particular data. Such copies are created by data mirroring, in which changes to a local copy of the data are mirrored on a remote copy.

A conventional data storage device, which is typically connected to a host processing system, contains an array of disk drives for data storage, a controller for controlling access to the disk array, and a cache memory. The cache memory is used for storing recently accessed data so as to provide quick access to data that is likely to be accessed in the near-term without having to access the disk on every occasion, thus reducing access latencies and throughput to applications running on the host processing system. When a data access request is received, the storage device first attempts to satisfy the request using the cache, before using the disk array. For example, when a READ operation is referencing data that is already in the cache, the data will be returned directly from the cache. For WRITE operations, the data is written into the data cache, replacing previous versions of the same data, if any, within the cache. Since a particular file or block of data may be located on the disk or in the cache, the storage device typically includes metadata (MD) that registers all data blocks currently in the cache and, therefore, indicates whether a data block is on the disk or stored in the cache. If the data block is in the cache, the MD indicates where the data block is stored in the cache. The MD also indicates the current state of the data block (i.e., whether or not it has been "flushed" to disk).

MD can take many forms and typically consists of complex data structures to describe the data stored in the cache. Therefore, any updates to the MD may involve a series of operations that should be performed atomically to maintain the integrity of the MD structure in the event of failure in the local or remote cache. That is, if one of the caches fails during a synchronous update of the MD, the integrity of the MD cannot be guaranteed. On the other hand, the data can be synchronously mirrored as it arrives from the hosts as it is essentially treated as a state-less stream of bytes (blocks) until its presence is properly registered in the MD.

Figure 1:
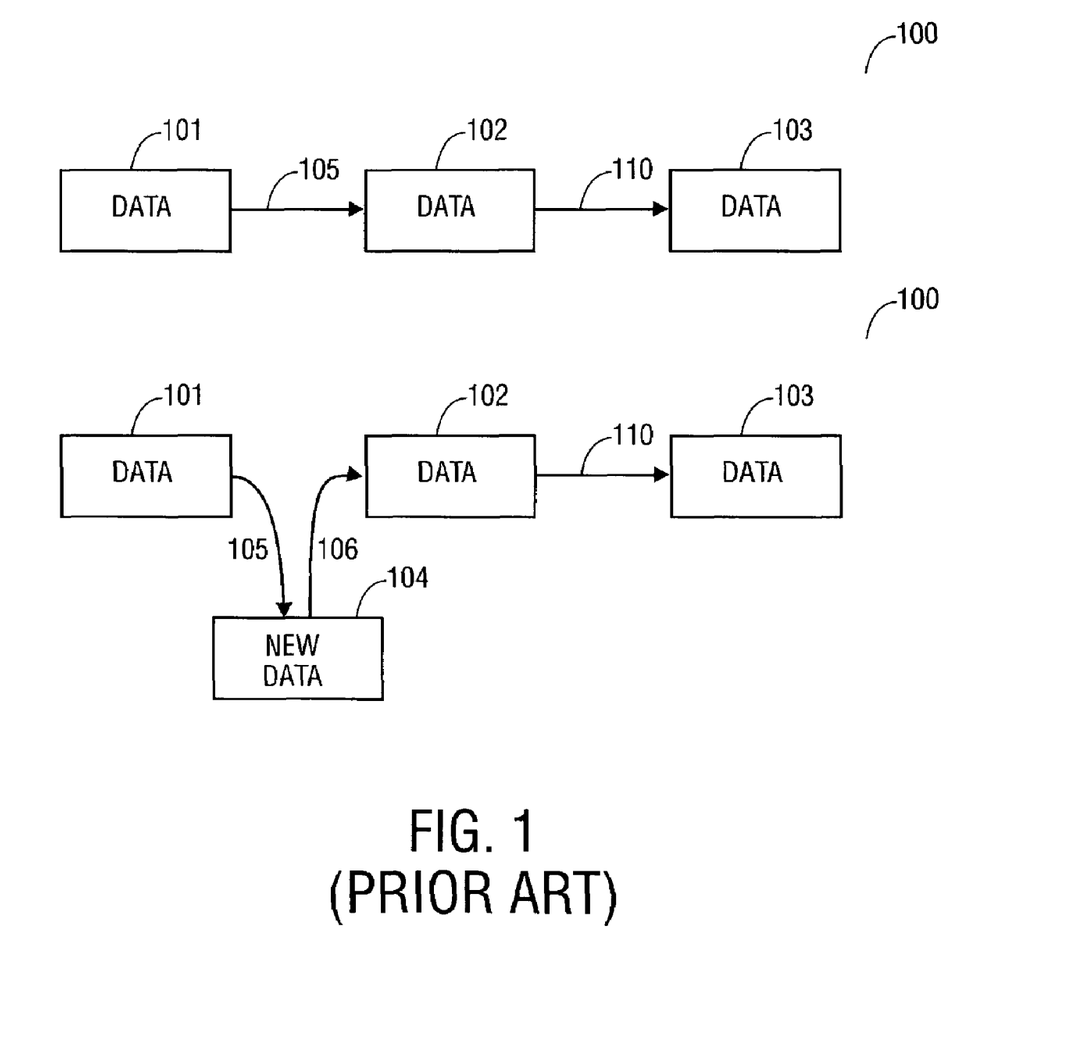
FIG. 1 illustrates the multiple operations to update a link-list data structure that may be used to implement the storage of MD as known in the art.

FIG. 1 illustrates the multiple operations to update a link-list data structure that may be used to implement the storage of MD as known in the art. As shown in FIG. 1, link-list 100 has data 101–103 and data pointers 105 and 110. To add new data 104 to the link-list requires that pointer 105 be redirected to new data 104 and that pointer 106 be implemented to point from new data 104 to data 102. In the case of a double pointer link-list, four independent operations may be required for an update. Complex MD structures (e.g., MD trees) may require even more operations to effect an update. A failure that occurs during the course of completing these operations will lead to an inconsistent version of the data on the remote data storage system. That is, once the series of update operations has begun the data is not consistent until the update operation is complete. Due to the number of operations involved in updating MD, there is an increased time during which a data storage system failure could result in inconsistent data. Moreover, any concurrent attempt to update the same data structure may cause the operations of each update attempt to become interleaved, thereby exacerbating the problem of inconsistent data.

SUMMARY

Embodiments of the present invention provide methods and apparatuses for accessing MD atomically. For one embodiment, the local cache and the remote cache are each provided with a memory burst engine (MBE). A local CPU performs a plurality of data update operations to update a corresponding plurality of data words of a local copy of data stored on a local cache memory, each data word having a corresponding memory address. The local MBE transmits the plurality of updated data words and the corresponding memory addresses as a plurality of packets to the remote MBE coupled to a remote cache memory. Each packet is stored at the remote MBE until the plurality of packets is received. The remote MBE then atomically updates a remote copy of data stored on the remote cache memory using the updated data words and the corresponding memory addresses such that access to the remote copy of data is prevented during updating.

Other features and advantages of embodiments of the present invention will be apparent from the accompanying drawings and from the detailed description that follows below.

BRIEF DESCRIPTION OF THE DRAWINGS

The invention may be best understood by referring to the following description and accompanying drawings that are used to illustrate embodiments of the invention. In the drawings.

DETAILED DESCRIPTION

Overview

Embodiments of the present invention provide methods and apparatuses for accessing MD atomically. For one embodiment, the local cache and the remote cache are each provided with a memory burst engine (MBE). To perform an atomic access operation, the local processing system allocates a burst descriptor buffer. The burst descriptor buffer is used to specify the addresses to be atomically accessed. For write operations, the burst descriptor buffer also specifies the update data. The addresses, and data, if any, are then transmitted to the remote cache as a series of packets constituting a single data access request. The MBE of the remote cache then performs the operations contained in the request. Upon completion of all of the operations the remote MBE transmits an acknowledgement. For read operations the remote MBE also transmits the requested data.

In the following description, numerous specific details are set forth. However, it is understood that embodiments of the invention may be practiced without these specific details. In other instances, well-known circuits, structures and techniques have not been shown in detail in order not to obscure the understanding of this description.

Reference throughout the specification to "one embodiment" or "an embodiment" means that a particular feature, structure, or characteristic described in connection with the embodiment is included in at least one embodiment of the present invention. Thus, the appearance of the phrases "in one embodiment" or "in an embodiment" in various places throughout the specification are not necessarily all referring to the same embodiment. Furthermore, the particular features, structures, or characteristics may be combined in any suitable manner in one or more embodiments.

Similarly, it should be appreciated that in the foregoing description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Figure 2:
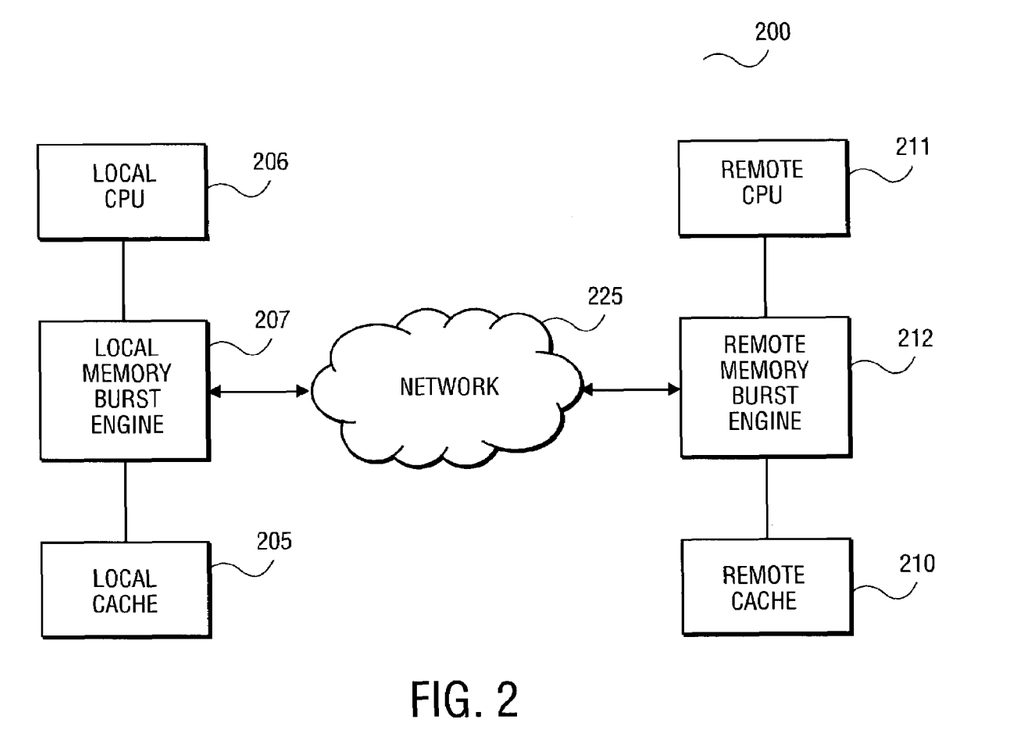
FIG. 2 illustrates a data storage system in which data may be remotely mirrored in accordance with one embodiment of the invention.

FIG. 2 illustrates a data storage system in which remote atomic operations may be performed on mirrored cache data in accordance with one embodiment of the invention. System 200, shown in FIG. 2, includes a local cache 205 connected via a communications link 225 to a remote cache 210. In various embodiments, the communications link 225 may be any type of communications network through which a plurality of different devices may communicate, such as, for example but not limited to, the Internet, a wide area network (WAN), a local area network (LAN), an intranet, or the like.

The local cache 205 and the remote cache 210 are coupled to respective CPUs, namely local CPU 206 and remote CPU 211 via a local MBE 207 and a remote MBE 212, respectively. The local MBE 207 and the remote MBE 212 may be implemented as a dedicated chip (e.g., a network interface chip) or a digital processing system (DPS). In accordance with an embodiment of the invention, the local MBE 207 and the remote MBE 212 exchange data via a shared communication protocol.

In accordance with an embodiment of the invention, the local MBE 207 creates a list of instructions, or a script, to effect an MD update. The script is transmitted to the remote MBE 212 in a commonly understood format. The remote MBE 212 executes the entire list of instructions before generating an acknowledgement and transmitting it to the local MBE. System 200 can be used to provide an atomic remote mirroring that provides consistent data in the event of a failure of either the local CPU or the remote CPU. For example, if the local cache 205 fails prior to a complete transaction, a consistent version of the data exists on the remote cache (i.e., nothing has been written to the remote cache). If the local cache 205 fails after transmitting the atomic update, the remote MBE 212 has all of the information necessary to complete the desired update and thereby obtain a valid version of the data on the remote cache 210 (i.e., the remote cache is fully updated).

Remote Atomic Scatter Operation

Figure 3:
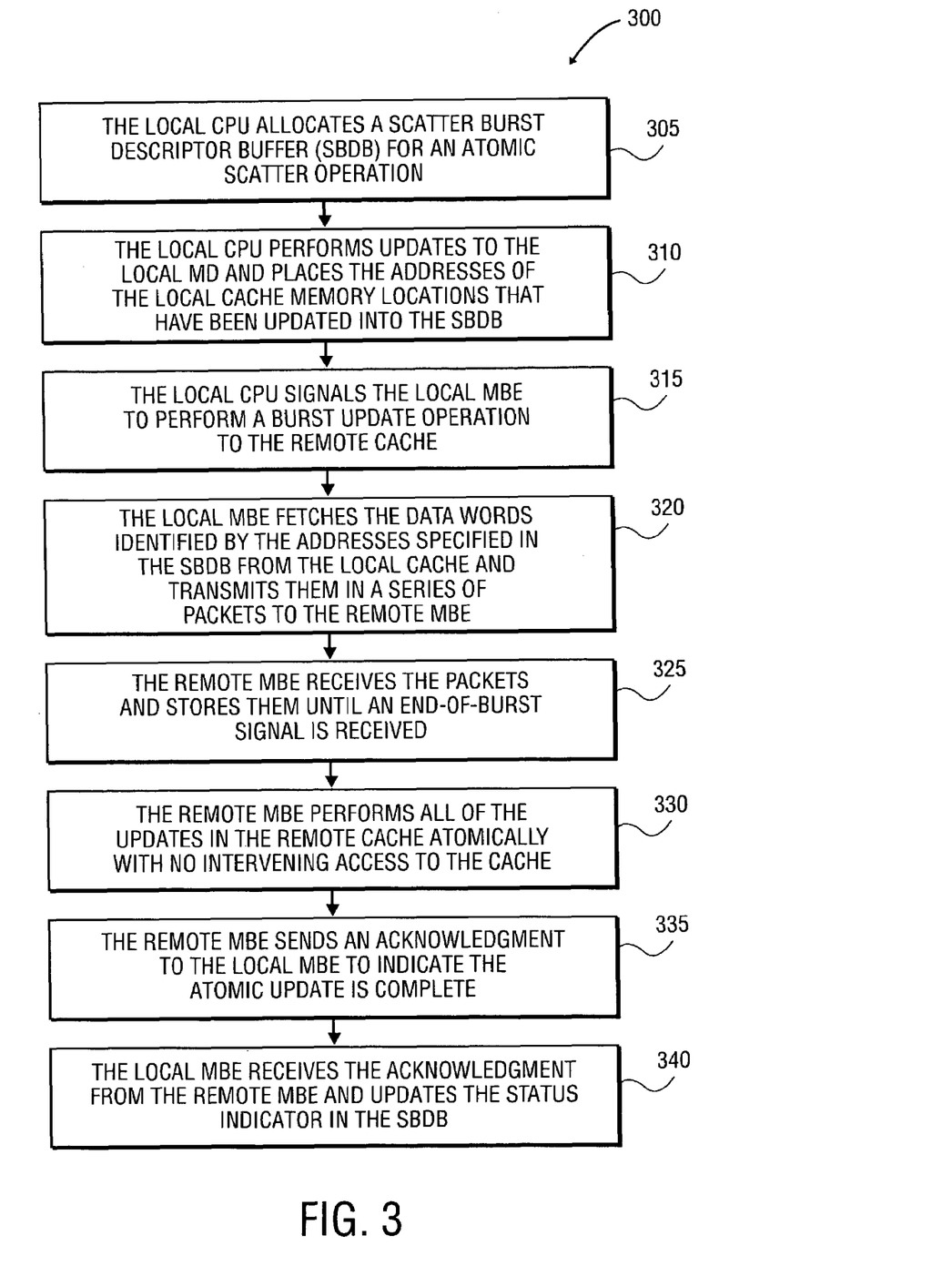
FIG. 3 illustrates a process by which a remote mirroring of an update to MD on a local cache is completed atomically in accordance with one embodiment of the present invention.
Figure 4A:
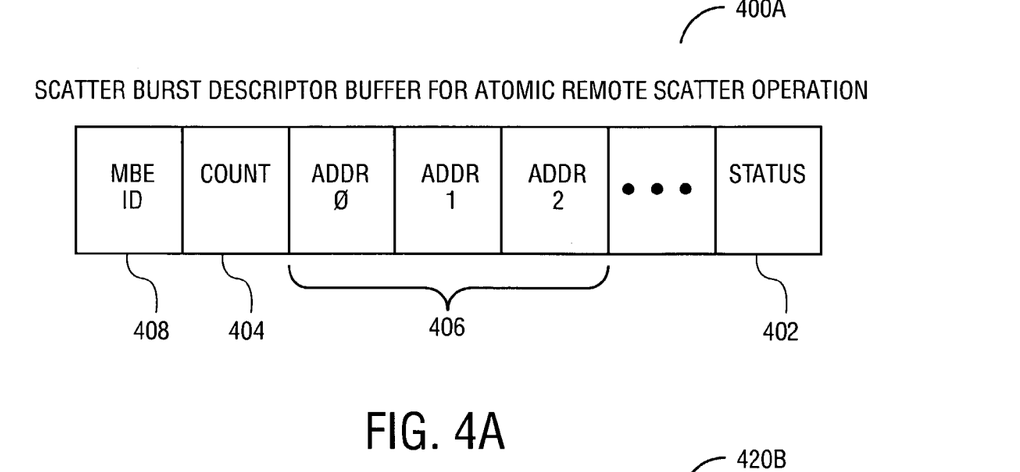
FIGS. 4A, 4B and 4C illustrate a scatter burst descriptor buffer (SBDB) format, a format for a request packet for an atomic scatter operation and a format for a response packet for an atomic scatter operation, respectively, in accordance with one embodiment of the invention.

FIG. 3 illustrates a process by which a remote mirroring of an update to MD on a local cache is completed atomically in accordance with one embodiment of the present invention. Process 300, shown in FIG. 3, begins at operation 305 in which the local CPU allocates a memory buffer for an atomic scatter operation. The memory buffer is known as a scatter burst descriptor buffer (SBDB). FIG. 4A illustrates a SBDB format in accordance with one embodiment of the invention. The SBDB 400A describes memory locations in both the local cache and the remote cache and also includes an atomic operation status indicator 402 as well as a memory location count indicator 404 that provides the total count of memory locations to be transmitted to the remote MBE. In alternative embodiments, the SBDBs can be implemented as on-chip memory within the MBE or as pre-assigned locations within the local cache or within the memory address space of the CPU.

At operation 310, once the SBDB is allocated, the CPU performs updates to the local MD while collecting the addresses of memory locations, within the local cache, that are modified during the MD update. The addresses of these local cache memory locations are placed in the SBDB (e.g., at data addresses 406) along with the count of the memory locations at 404 and an identification for the remote MBE (at MBE identification indicator 408).

At operation 315, the CPU requests the local MBE to perform a burst update to the remote cache. These requests are made at specified and well-defined points in the MD update process, that is when the MD has been put into a consistent state.

Figure 4B:
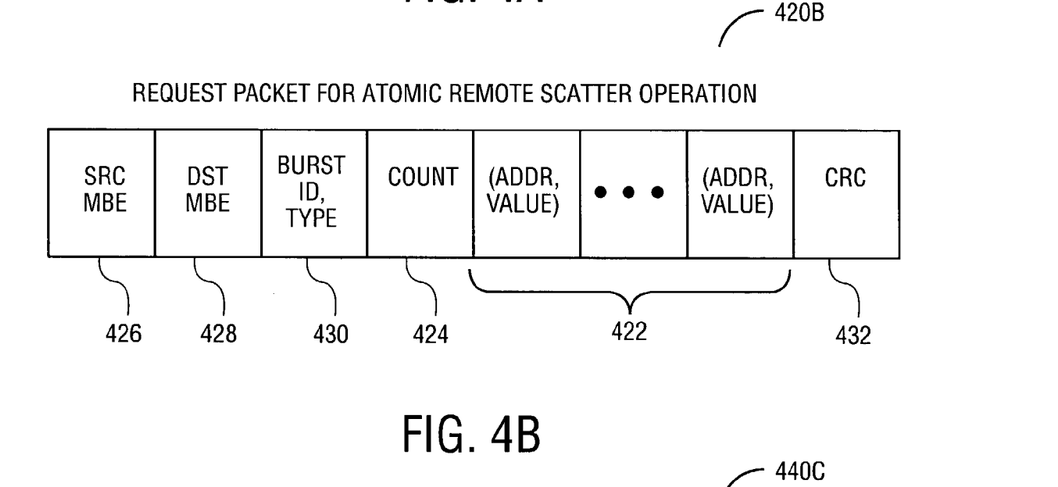

At operation 320 the local MBE fetches the data words identified by the addresses specified in the SBDB from the local cache. The local MBE then transmits the data words in a series of packets to the remote MBE. FIG. 4B illustrates the format for a request packet for an atomic scatter operation in accordance with one embodiment of the invention. The request packet 420B, shown in FIG. 4B consists of a series of memory address/value pairs 422. The memory address/value pairs 422, which consist of memory addresses followed by memory values to be stored at those addresses, may be of fixed length (i.e., a specified number of bytes). In alternative embodiments the length may be variable, and in such embodiments the length is supplied along with the memory address. The request packet 420B also includes a count indicator 424 to indicate the number of addresses. The request packet 420B also includes a source MBE indicator 426, a destination MBE indicator 428, a burst identification 430, and a cyclic redundancy check (CRC) 432.

At operation 325 the remote MBE receives the packets and stores them in a temporary location until an end-of-burst signal is received.

At operation 330 the remote MBE performs all of the updates (WRITE operations) in the remote cache atomically while allowing no intervening access to the cache.

Figure 4C:
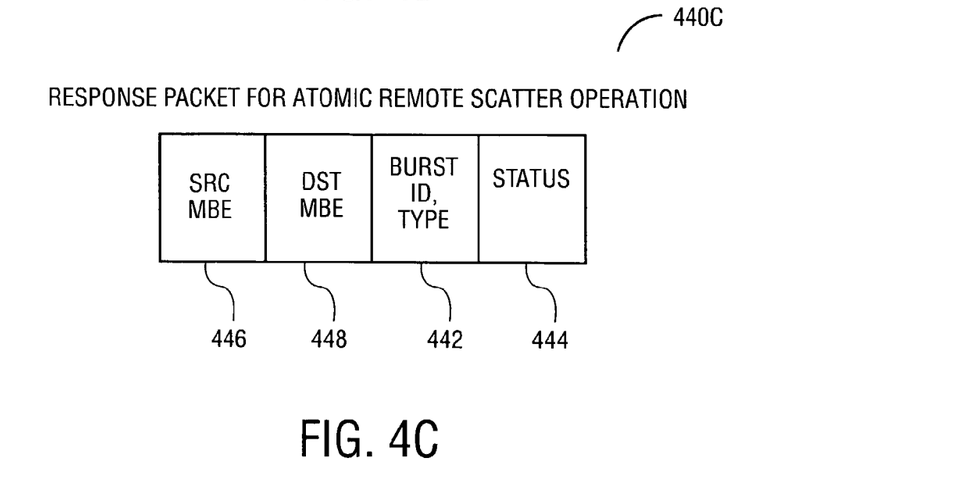

At operation 335 the remote MBE sends an acknowledgement to the local MBE to indicate the atomic update is complete. FIG. 4C illustrates the format for a response packet for an atomic scatter operation in accordance with one embodiment of the invention. Response packet 440C, shown in FIG. 4C includes a burst identification indicator 442 as well as a source MBE indicator 446 and a destination MBE indicator 448 to specify the burst. Response packet 440C also includes a status indicator 444 to indicate completion (or failure) of the atomic update operation.

At operation 340 the local MBE receives the acknowledgement from the remote MBE and updates the status indicator (e.g., status indicator 402 in the SBDB 400A).

Remote Atomic Gather Operation

In a remote atomic gather operation, the local CPU accesses MD in the remote cache atomically. The contents of either the local cache or the remote cache are not modified during a remote atomic gather operation and therefore the window of atomicity may be fairly relaxed with regard to the integrity of the MD in the cache. However, situations may arise in which the result of a remote READ operation affects the execution of subsequent instructions in an instruction stream and the CPU must complete reading the contents of a remote address before proceeding.

Figure 5:
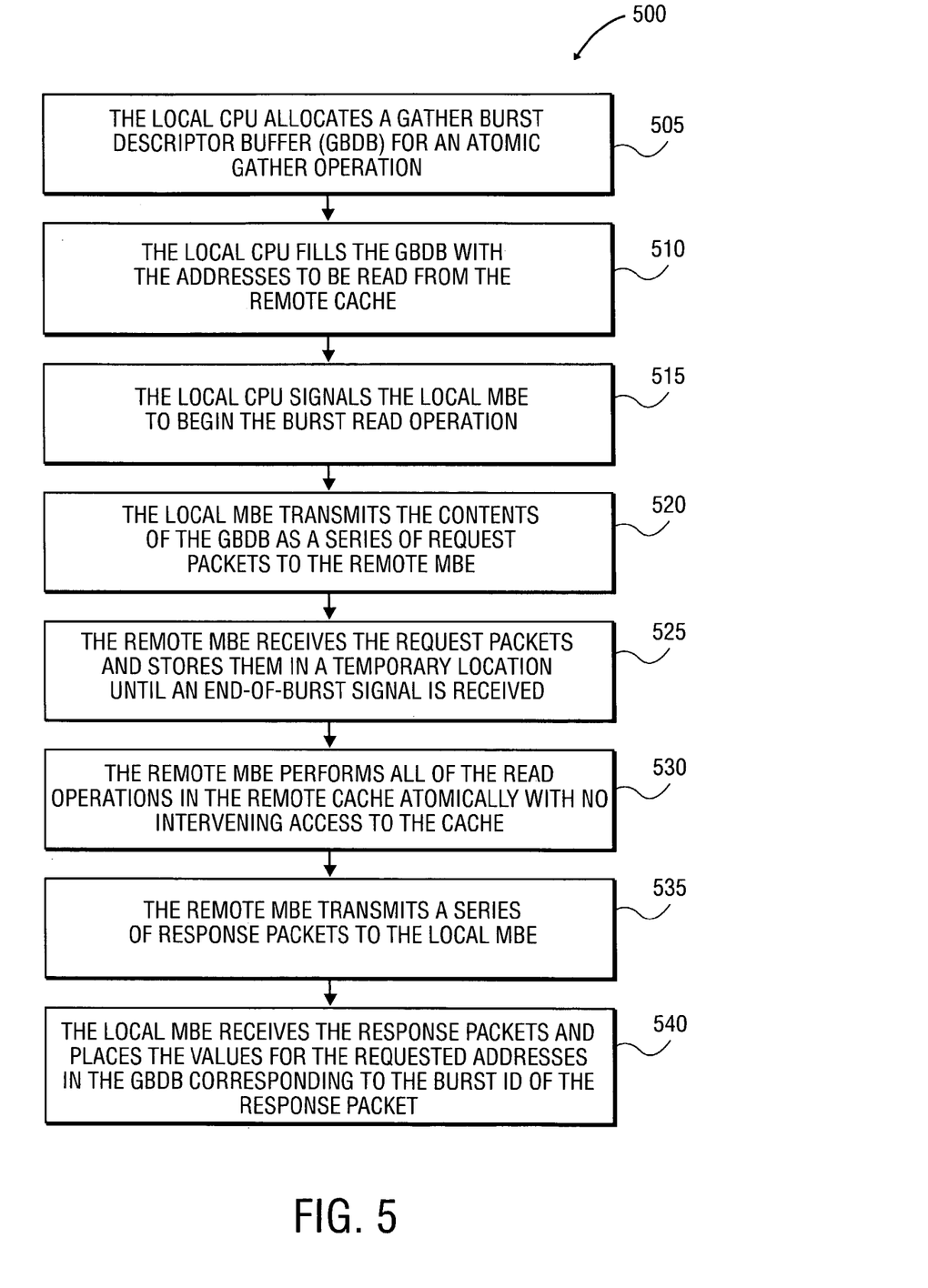
FIG. 5 illustrates a process by which a local CPU accesses mirrored MD from a remote cache atomically in accordance with one embodiment of the present invention.
Figure 6A:
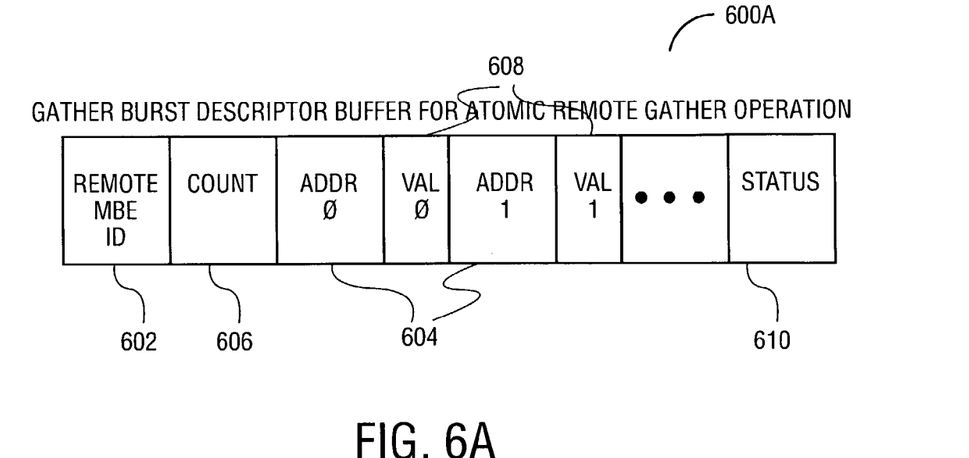
FIGS. 6A, 6B and 6C illustrate a gather burst descriptor (GBDB) format, a format for a request packet for an atomic scatter operation and a format for a response packet for an atomic gather operation, respectively, in accordance with one embodiment of the invention.

FIG. 5 illustrates a process by which a local CPU accesses MD from a remote cache atomically in accordance with one embodiment of the present invention. Process 500, shown in FIG. 5, begins at operation 505 in which the local CPU allocates a memory buffer for an atomic gather operation. The memory buffer is known as a gather burst descriptor buffer (GBDB). FIG. 6A illustrates a GBDB format in accordance with one embodiment of the invention. The GBDB 600A includes a remote MBE identification indicator 602 and a number of addresses 604 to indicate where the atomic gather operation is directed, as well as a count indicator 606 to indicate the number of addresses to be read from. GBDB 600A also includes a number of locations 608 into which the values of the corresponding addresses 604 will be stored upon completion of the atomic gather operation and a status indicator 610 to indicate the completion of the atomic gather operation.

At operation 510 the local CPU fills the GBDB with the addresses that need to be read atomically from the remote cache.

At operation 515 the local CPU signals the local MBE to begin the burst READ operation. In one embodiment the signaling mechanism may be a WRITE operation into the status field of the GBDB. In an alternative embodiment the signaling mechanism may be a READ operation performed on the contents of the status field of the GBDB.

Figure 6B:
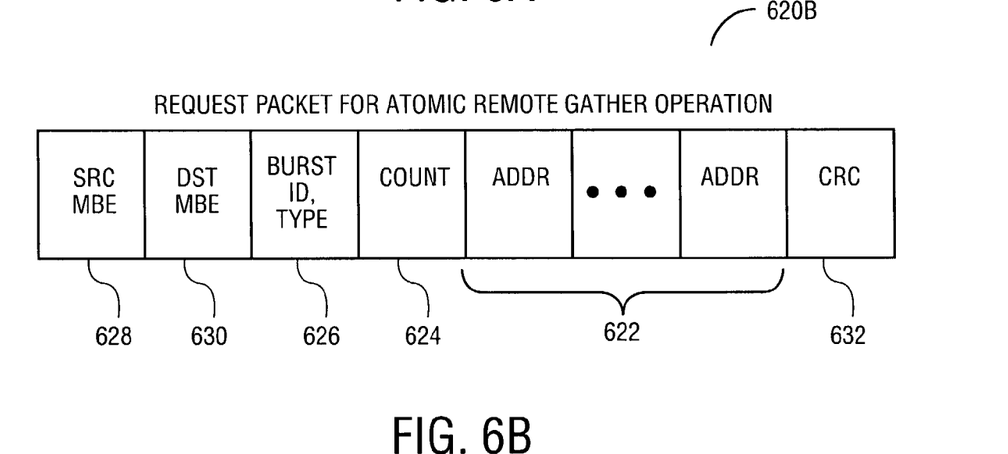

At operation 520, the local MBE, having received a signal from the local CPU to begin the burst read operation, transmits the contents of the GBDB as a series of request packets to the remote MBE. The request packets consist of a series of memory addresses. FIG. 6B illustrates a format for a request packet for an atomic gather operation in accordance with one embodiment of the invention. Request packet 620B includes addresses 622 to which the remote gather operation is directed, as well as a count indicator 624 to indicate the number of addresses 622. Response packet 620B also includes a burst identification indicator 626 as well as a source MBE indicator 628, a destination MBE indicator 630, to specify the burst, and a CRC 632.

At operation 525 the remote MBE receives the request packets and stores them in a temporary location until an end-of-burst signal is received.

At operation 530 the remote MBE performs all of the READ operations in the remote cache atomically while allowing no intervening access to the cache.

Figure 6C:
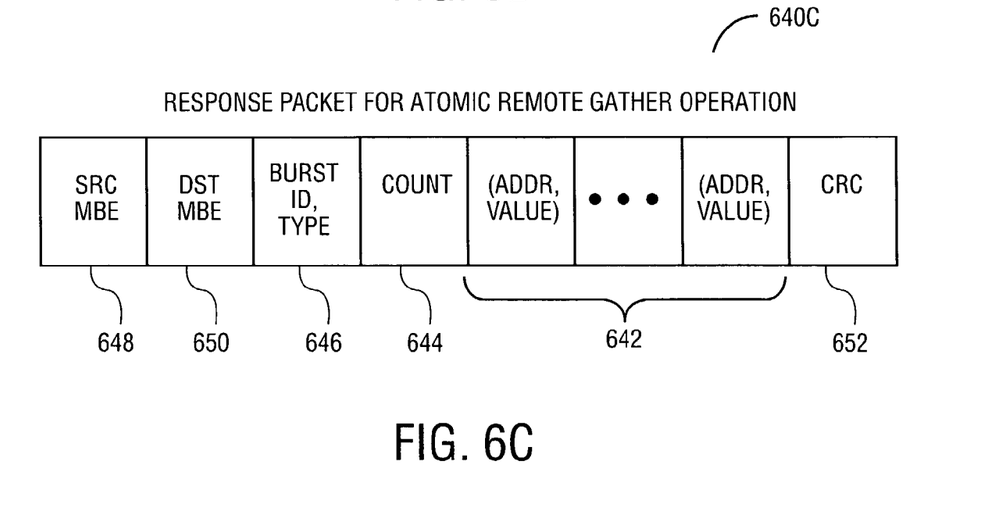

At operation 535 the remote MBE transmits a series of response packets to the local MBE. FIG. 6C illustrates a format for a response packet for an atomic gather operation in accordance with one embodiment of the invention. Response packet format 640C, shown in FIG. 6C, includes a number of address/value pairs 642 that consist of memory addresses as requested in the gather request (i.e., addresses 622) followed by memory values as read from the remote cache. The response packet 640C also includes a count indicator 644 to indicate the number of address/value pairs 642. Response packet 640C also includes a burst identification indicator 646 as well as a source MBE indicator 648, a destination MBE indicator 650, to specify the burst, and a CRC 652. The response packet effectively acts as an acknowledgement packet to the original gather request.

At operation 540 the local MBE receives the response packets for the gather request from the remote MBE and places the values for the requested addresses in the GBDB corresponding to the burst ID for which the response packet was received. When the end of the response packet for a given burst is signaled, the local MBE updates the status indicator of the GBDB (i.e., status indicator 610).

General Matters

Embodiments of the invention may be applied to provide atomic remote memory operations in a cache mirroring data storage system. For one embodiment, the local cache and the remote cache are each provided with an MBE. The MBE is an interface processing component that may be implemented as a network interface chip (NIC) or processing system. The MBE is able to receive an entire set of remote atomic memory operation instructions and postpone performing the instructions until the entire set is received. The MBE performs the operations atomically and acknowledges completion of the set of memory access operations.

As described above in reference to operations 305 and 505, to perform an atomic remote memory operation, the local processing system allocates a burst descriptor buffer (e.g., either a SBDB or a GBDB). The length of the burst descriptor buffer may vary, but practically its size may be limited to accommodate the largest possible atomicity window. That is, the burst descriptor buffer need only be large enough to accommodate the total number of memory operations to be performed atomically in order to maintain MD integrity upon failure of either the local cache or remote cache. Additionally, the size of the burst descriptor buffer may be limited by the time necessary to effect the memory operations of the burst in the remote cache.

For one embodiment, the signaling mechanism used by the local CPU to signal the local MBE to perform a burst memory operation to the remote cache, as described above in reference to operations 315 and 515, may be a memory READ operation. If such a signaling mechanism is employed the local CPU will obtain the status as a return value for the burst request signaling issued to initiate the burst. The CPU will stall until the MBE returns the status code. In the event of an error, where the response of acknowledgement is not received from the remote MBE, the local MBE will "time out" the burst operation after a specified time. Upon time out, the local MBE will indicate burst failure in the status field of the burst descriptor buffer.

In an alternative embodiment, the signaling mechanism used by the local CPU to signal the local MBE to perform a burst memory operation to the remote cache is a WRITE operation to the status field. Such a signaling mechanism may be implemented to avoid stalling the CPU for the entire duration of the burst memory operation. The WRITE operation initializes the status field in the burst descriptor buffer and serves as a burst signal request to the local MBE. To determine burst completion, the local CPU periodically checks the status field in the burst descriptor buffer, or alternatively, the MBE may be programmed to interrupt the CPU upon status update. The local CPU may determine a burst operation failure after a specified number of status checks or after a specified time. Upon a burst operation failure, the CPU may reissue the burst request.

As discussed above in reference to operation 540, the local MBE receives the response packets for the gather request from the remote MBE and places the values for the requested addresses in the GBDB corresponding to the burst ID for which the response packet was received. Alternatively or additionally, the requesting local CPU may wish to place the incoming data into a series of non-contiguous addresses. In such case, for one embodiment, the remote MBE transmits a series of packets with the local addresses followed by data. In an alternative embodiment, the local CPU may wish to place the incoming data in a contiguous region in a local buffer. In such case, for one embodiment, the local MBE places the incoming data into a buffer specified by the local CPU.

The invention includes various operations. It will be apparent to those skilled in the art that the operations of the invention may be performed by hardware components or may be embodied in machine-executable instructions, which may be used to cause a general-purpose or special-purpose processor or logic circuits programmed with the instructions to perform the operations. Alternatively, the steps may be performed by a combination of hardware and software. The invention may be provided as a computer program product that may include a machine-readable medium having stored thereon instructions, which may be used to program a computer (or other electronic devices) to perform a process according to the invention. The machine-readable medium may include, but is not limited to, floppy diskettes, optical disks, CD-ROMs, and magneto-optical disks, ROMs, RAMs, EPROMs, EEPROMs, magnet or optical cards, flash memory, or other type of media/machine-readable medium suitable for storing electronic instructions. Moreover, the invention may also be downloaded as a computer program product, wherein the program may be transferred from a remote computer to a requesting computer by way of data signals embodied in a carrier wave or other propagation medium via a communication cell (e.g., a modem or network connection).

While the invention has been described in terms of several embodiments, those skilled in the art will recognize that the invention is not limited to the embodiments described, but can be practiced with modification and alteration within the spirit and scope of the appended claims. The description is thus to be regarded as illustrative instead of limiting.

What is claimed is:

1. A method, comprising:
   (a) allocating a memory buffer for use in a data mirroring operation;
   (b) updating a local copy of data stored in a local cache while storing, in said memory buffer, addresses of memory locations of the local cache that are modified during said updating;
   (c) performing a burst update to a remote cache communicatively coupled to the local cache by (i) fetching data words identified by the addresses of the memory locations of the local cache, (ii) transmitting the data words to the remote cache, and (iii) receiving and storing the data words in a temporary location accessible by the remote cache until an end-of-burst signal is received;
   (d) following receipt of the end-of-burst signal, updating, using the data words, memory locations in the remote cache that correspond to the addresses of the memory locations of the local cache, said updating taking place atomically so as not to permit intervening access to the remote cache; and
   (e) sending an acknowledgement indicating the updating of the remote cache is complete.

2. The method of claim 1, wherein allocating the memory buffer comprises allocating storage locations of a scatter burst descriptor buffer (SBDB) for atomic memory operation status indicators and said address of memory locations of the local cache.

3. The method of claim 2, wherein allocating the memory buffer further comprises allocating storage locations of the SBDB for a count of memory locations corresponding to data words to be transmitted to the remote cache.

4. The method of claim 1, wherein the addresses of the local cache memory locations are placed in the memory buffer along with a count of said local cache memory locations and a remote cache identification indicator.

5. The method of claim 1, further comprising and prior to performing the burst update, requesting the local cache to perform a burst update to the remote cache subsequent to a time when the local cache has achieved a consistent data state.

6. The method of claim 2, wherein requesting the local cache to perform a burst update comprises issuing a request packet for an atomic scatter operation to the local cache, the request packet including a series of memory address/data value pairs.

7. The method of claim 6, wherein the memory address/data value pairs include respective ones of the memory addresses of the local cache, each followed by a corresponding one of the data values.

8. The method of claim 6, wherein the request packet includes a count indicator to indicate the number of memory addresses.

9. The method of claim 6, wherein the request packet also includes one or more of: a source cache indicator, a destination cache indicator, a burst identification, and/or a cyclic redundancy check.

10. The method of claim 2, wherein sending an acknowledgement comprises sending a response packet for an atomic scatter operation, the response packet including one or more of: a burst identification indicator, a source cache indicator, a destination cache indicator, and/or a status indicator to indicate completion or failure of the updating operation.

11. the method of claim 2, further comprising receiving the acknowledgement from the remote cache and updating a status indicator to reflect completion or failure of the updating operation.

12. A machine-readable medium having one or more executable instructions stored thereon, which when executed by a digital processing system, cause the digital processing system to perform a method, the method comprising:
   (a) allocating a memory buffer for use in a data mirroring operation;

(b) updating a local copy of data stored in a local cache while storing, in said memory buffer, addresses of memory locations of the local cache that are modified during said updating;

(c) performing a burst update to a remote cache communicatively coupled to the local cache by (i) fetching data words identified by the addresses of the memory locations of the local cache, (ii) transmitting the data words to the remote cache, and (iii) receiving an acknowledgement from the remote cache indicating that updating of the remote cache has been completed, said updating of the remote cache involving first storing the data words in a temporary location accessible by the remote cache until an end-of-burst signal is received, following receipt of the end-of-burst signal, updating, using the data words, memory locations in the remote cache that correspond to the addresses of the memory locations of the local cache, said updating taking place atomically so as not to permit intervening access to the remote cache;

and sending the acknowledgement.

13. The machine-readable medium of claim 12, wherein allocating the memory buffer comprises allocating storage locations of a scatter burst descriptor buffer (SBDB) for atomic memory operation status indicators and said address of memory locations of the local cache.

14. The machine readable medium of claim 13, wherein allocating the memory buffer further comprises allocating storage locations of the SBDB for a count of memory locations corresponding to data words to be transmitted to the remote cache.

15. The machine readable medium of claim 12, wherein the addresses of the local cache memory locations are placed in the memory buffer along with a count of said local cache memory locations and a remote cache identification indicator.

16. The machine readable medium of claim 12, wherein the method further comprises, prior to performing the burst update, requesting the local cache to perform a burst update to the remote cache subsequent to a time when the local cache has achieved a consistent data state.

17. The machine readable medium of claim 16, wherein requesting the local cache to perform a burst update comprises issuing a request packet for an atomic scatter operation to the local cache, the request packet including a series of memory address/data value pairs.

18. The machine readable medium of claim 17, wherein the memory address/data value pairs include respective ones of the memory addresses of the local cache, each followed by a corresponding one of the data values.

19. The machine readable medium of claim 17, wherein the request packet includes a count indicator to indicate the number of memory addresses.

20. The machine readable medium of claim 19, wherein the request packet also includes one or more of: a source cache indicator, a destination cache indicator, a burst identification, and a cyclic redundancy check field.

21. A method, comprising:
(a) allocating a memory buffer for use in a data mirroring operation;
(b) populating the memory buffer with addresses that need to be read atomically from a remote cache;
(c) initiating a burst read operation;
(d) transmitting the contents of the memory buffer;
(e) receiving, at the remote cache, the contents of the memory buffer and storing them in a temporary location until an end-of-burst signal is received;
(f) following receipt of the end-of-burst signal, performing read operations to all of the addresses in the remote cache atomically while allowing no intervening access to the remote cache;
(g) transmitting a series of response packets corresponding to the read operations;
(h) receiving the response packets and placing data values for the addresses in the memory buffer; and
(i) upon receipt of an end of response indicator for the burst read operation, updating a status indicator to indicate completion of the burst read operation.

22. The method of claim 21, wherein allocating the memory buffer comprises allocating a gather burst descriptor buffer so as to store the addresses that need to be read atomically from the remote cache as well as a remote cache identification indicator and a count indicator to indicate the number of addresses to be read from.

23. The method of claim 21, wherein the burst read operation is initiated following a write operation into a status field of the memory buffer.

24. The method of claim 21, wherein the burst read operation is initiated following a read operation performed on contents of a status field of the memory buffer.

25. The method of claim 21, wherein transmitting the contents of the memory buffer comprises transmitting a series of request packets, each of the request packets including a series of memory addresses.

26. The method of claim 25, wherein each of the request packets further includes one or more of: a count indicator to indicate the number of said memory addresses, a burst identification indicator, a source cache indicator, a destination cache indicator, and a cyclic redundancy check field.

27. The method of claim 25, wherein each of the response packets comprises one or more of: a number of address/value pairs, each including memory addresses as requested followed by memory values as read from the remote cache; a count indicator to indicate the number of said address/value pairs; a burst identification indicator; a source cache indicator; a destination cache indicator; and a cyclic redundancy check field.

28. A machine-readable medium having one or more executable instructions stored thereon, which when executed by a digital processing system, cause the digital processing system to perform a method, the method comprising:
(a) allocating a memory buffer for use in a data mirroring operation;
(b) populating the memory buffer with addresses that need to be read atomically from a remote cache;
(c) initiating a burst read operation;
(d) transmitting the contents of the memory buffer;
(e) receiving a series of response packets indicating completion of the burst read operation by which the contents of the memory buffer were received and stored in a temporary location until an end-of-burst signal was received, after which read operations to all of the addresses in the remote cache were performed atomically while allowing no intervening access to the remote cache, and the response packets corresponding to the read operations transmitted upon completion thereof; and
(f) upon receipt of an end of response indicator for the burst read operation, updating a status indicator to indicate completion of the burst read operation.

29. The machine readable medium of claim 28, wherein allocating the memory buffer comprises allocating a gather burst descriptor buffer so as to store the addresses that need to be read atomically from the remote cache as well as a remote cache identification indicator and a count indicator to indicate the number of addresses to be read from.

30. The machine readable medium of claim 28, wherein the burst read operation is initiated following a write operation into a status field of the memory buffer.

31. The machine readable medium of claim 28, wherein the burst read operation is initiated following a read operation performed on contents of a status field of the memory buffer.

32. The machine readable medium of claim 28, wherein transmitting the contents of the memory buffer comprises transmitting a series of request packets, each of the request packets including a series of memory addresses.

33. The machine readable medium of claim 32, wherein each of the request packets further includes one or more of: a count indicator to indicate the number of said memory addresses, a burst identification indicator, a source cache indicator, a destination cache indicator, and a cyclic redundancy check field.

34. The machine readable medium of claim 28, wherein each of the response packets comprises one or more of: a number of address/value pairs, each including memory addresses as requested followed by memory values as read from the remote cache; a count indicator to indicate the number of said address/value pairs; a burst identification indicator; a source cache indicator; a destination cache indicator; and a cyclic redundancy check field.

* * * * *